US012195639B2

(12) United States Patent
Weaver et al.

(10) Patent No.: US 12,195,639 B2
(45) Date of Patent: *Jan. 14, 2025

(54) CORROSION PROTECTION FOR METALLIC SUBSTRATES

(71) Applicant: APPLIED GRAPHENE MATERIALS UK LIMITED, Redcar (GB)

(72) Inventors: William Weaver, Redcar (GB); Matthew David Sharp, Redcar (GB); Gaven Johnson, Redcar (GB)

(73) Assignee: APPLIED GRAPHENE MATERIALS UK LIMITED, Redcar (GB)

( * ) Notice: Subject to any disclaimer, the term of this patent is extended or adjusted under 35 U.S.C. 154(b) by 1169 days.

This patent is subject to a terminal disclaimer.

(21) Appl. No.: 16/967,792

(22) PCT Filed: Feb. 6, 2019

(86) PCT No.: PCT/GB2019/050322
§ 371 (c)(1),
(2) Date: Aug. 6, 2020

(87) PCT Pub. No.: WO2019/155207
PCT Pub. Date: Aug. 15, 2019

(65) Prior Publication Data
US 2020/0362463 A1  Nov. 19, 2020

(30) Foreign Application Priority Data
Feb. 6, 2018 (GB) ..................... 1801931

(51) Int. Cl.
| B05D 7/14 | (2006.01) |
| C01B 32/158 | (2017.01) |
| C01B 32/194 | (2017.01) |
| C08K 3/04 | (2006.01) |
| C09D 5/08 | (2006.01) |
| C09D 5/24 | (2006.01) |
| C09D 7/40 | (2018.01) |

(Continued)

(52) U.S. Cl.
CPC ............. *C09D 5/084* (2013.01); *B05D 7/14* (2013.01); *C01B 32/158* (2017.08); *C01B 32/194* (2017.08); *C08K 3/042* (2017.05); *C09D 5/08* (2013.01); *C09D 5/24* (2013.01); *C09D 7/61* (2018.01); *C09D 7/62* (2018.01); *C09D 7/66* (2018.01); *C09D 7/69* (2018.01); *C09D 7/70* (2018.01); *C09D 163/00* (2013.01); *C23C 28/04* (2013.01); *B05D 1/36* (2013.01); *B05D 7/54* (2013.01); *B05D 2202/20* (2013.01); *B05D 2202/25* (2013.01); *B05D 2601/20* (2013.01); *B82Y 30/00* (2013.01); *C01B 32/182* (2017.08); *C01B 2202/22* (2013.01); *C01B 2204/04* (2013.01); *C01B 2204/22* (2013.01); *C01B 2204/32* (2013.01); *C01P 2004/20* (2013.01); *C01P 2004/24* (2013.01); *C01P 2004/60* (2013.01); *C01P 2004/64* (2013.01); *C01P 2006/40* (2013.01); *C09D 7/20* (2018.01); *C09D 7/40* (2018.01)

(58) Field of Classification Search
CPC . C09D 5/084; C09D 5/08; C09D 5/24; C09D 7/61; C09D 7/62; C09D 7/66; C09D 7/69; C09D 7/70; C09D 163/00; C09D 7/20; C09D 7/40; C09D 7/00; C09D 5/00; B05D 7/14; B05D 1/36; B05D 7/54; B05D 2202/20; B05D 2202/25; B05D 2601/20; C01B 32/158; C01B 32/194; C01B 32/182; C01B 2202/22; C01B 2204/04; C01B 2204/22; C01B 2204/32; C08K 3/042; C08K 3/04; C23C 28/04; C23C 28/00; B82Y 30/00; C01P 2004/20; C01P 2004/24; C01P 2004/60; C01P 2004/64; C01P 2006/40
See application file for complete search history.

(56) References Cited

U.S. PATENT DOCUMENTS

| 9,868,875 B2 | 1/2018 | Rudhardt et al. |
| 2011/0303121 A1 | 12/2011 | Geim et al. |

(Continued)

FOREIGN PATENT DOCUMENTS

| CN | 104559424 A | 4/2015 |
| CN | 105008466 A | 10/2015 |

(Continued)

OTHER PUBLICATIONS

CN-106010091-A, machine translation (Year: 2016).*

(Continued)

Primary Examiner — Anthony J Green
Assistant Examiner — Marites A Guino-O Uzzle
(74) Attorney, Agent, or Firm — Lee & Hayes, P.C.

(57) ABSTRACT

A composition suitable for coating a metallic substrate that is susceptible to corrosion is disclosed. The composition comprises a carrier medium, 2D material/graphitic platelets, and one or both of conductive carbon black particles and carbon nanotubes, in which the 2D material/graphitic platelets comprise nanoplates of one or more 2D materials and or nanoplates of one or more layered 2D materials and or graphite flakes in which the graphite flakes have one nanoscale dimension and 25 or less layers, the conductive carbon black particles have a mean particle size in the range of 1 nm to 1000 nm, and the carbon nanotubes are single or multiwalled.

18 Claims, 8 Drawing Sheets

(51) Int. Cl.
C09D 7/61 (2018.01)
C09D 7/62 (2018.01)
C09D 163/00 (2006.01)
C23C 28/04 (2006.01)
B05D 1/36 (2006.01)
B05D 7/00 (2006.01)
B82Y 30/00 (2011.01)
C01B 32/182 (2017.01)
C09D 7/20 (2018.01)

(56) References Cited

U.S. PATENT DOCUMENTS

| | | | | |
|---|---|---|---|---|
| 2016/0024310 A1* | 1/2016 | McMullin | ............... | C09D 7/62 523/400 |
| 2016/0185983 A1* | 6/2016 | Lui | ............... | C09D 7/70 252/75 |
| 2017/0349763 A1 | 12/2017 | Wu et al. | | |

FOREIGN PATENT DOCUMENTS

| | | | | |
|---|---|---|---|---|
| CN | 105802452 A | | 7/2016 | |
| CN | 105925100 A | | 9/2016 | |
| CN | 105949854 A | | 9/2016 | |
| CN | 106010091 A | * | 10/2016 | ............ C08K 13/02 |
| CN | 106232737 A | | 12/2016 | |
| CN | 106497338 A | | 3/2017 | |
| CN | 106519855 A | | 3/2017 | |
| CN | 106590073 A | | 4/2017 | |
| CN | 106893447 A | | 6/2017 | |
| CN | 107459906 A | | 12/2017 | |
| CN | 107474450 A | | 12/2017 | |
| CN | 107760128 A | | 3/2018 | |
| CN | 108276866 A | | 7/2018 | |
| GB | 2548394 A | | 9/2017 | |
| GB | 2556879 A | | 6/2018 | |
| GB | 2528306 A | | 5/2020 | |

OTHER PUBLICATIONS

Encyclopedia Britannica. Insulator [retrieved from the internet at Nov. 29, 2023 from <URL:https://www.britannica.com/science/insulator> and the way back machine from <URL: https://web.archive.org/web/20150905212037/https://www.britannica.com/science/insulator>] (Year: 2015).*
GB Examination Report issued Mar. 14, 2022 for GB Application 1901656.7 , 3 pages.
Chinese office action for CN patent related to U.S. Appl. No. 16/967,792 Mailed on Apr. 1, 2021 Weaver,William "Corrosion Protection for Metallic Substrates" 20 Pages.
Chinese office action for CN patent related to U.S. Appl. No. 16/967,792 Mailed on Nov. 30, 2021 Weaver,William "Corrosion Protection for Metallic Substrates" 12 Pages.
Singapore office action for SG patent application No. 11202007283R, related to U.S. Appl. No. 16/967,792 Mailed on Nov. 29, 2021 Weaver,William "Corrosion Protection for Metallic Substrates" 8 Pages.
GB Search Report issued Jul. 26, 2018 for GB Application 1901656.7, 2 pages.
GB Search Report issued Jul. 25, 2018 for priority GB Application 1801931.5, 5 pages.
PCT Search Report and Written Opinon mailed May 21, 2019, for OCT/GB2019/050322, 17 pages.
Swetha Chandrasekaran et al: "Thermally reduced graphene oxide acting as a trap for multiwall carbon nanotubes in bi-filler epoxy composites", Composites Part A: Applied Science and Manufacturing, vol. 49, Feb. 26, 2013 (Feb. 26, 2013), pp. 51-57, XP055586938, Amsterdam, NL ISSN: 1359-835X, DOI: 10.1016/j.compositesa.2013.02.008.
Yang S Y et al: "Synergetic effects of graphene platelets and carbon nanotubes on the mechanical and thermal properties of epoxy composites", Carbon, Elsevier, Oxford, GB, vol. 49, No. 3, Mar. 1, 2011 (Mar. 1, 2011 ), pp. 793-803, XP027561956, ISSN: 0008-6223 [retrieved on Dec. 15, 2010].

* cited by examiner

|  | Conductivity (S/m @20°C) |
|---|---|
| Aluminium | $3.50 \times 10^7$ |
| Magnesium | $2.15 \times 10^7$ |
| Graphene Grade 1 | $1.00 \times 10^8$ |
| Graphene Grade 2 | $2.00 \times 10^{-5}$ |
| Conductive Carbon Black (CB) | $1.00 \times 10^4$ |
| Single Wall Carbon Nanotubes (SWCNTs) | $1.00 \times 10^6 - 1.00 \times 10^7$ |

FIG. 1

| Formulation: | Control A | Control B | 1 | 2 | 3 | 4 | 5 | 6 | 7 | 8 | 9 | 10 |
|---|---|---|---|---|---|---|---|---|---|---|---|---|
| Epoxy (wt%) | 100.000 | 0.000 | 99.9 | 99.97 | 99.997 | 99.5 | 99.97 | 99.997 | 99.9 | 99.9 | 99.9 | 99.9 |
| Graphene Grade 1 (wt%) | 0.000 | 0.000 | 0.1 | 0.03 | 0.003 | 0 | 0.000 | 0.000 | 0 | 0 | 0.05 | 0.05 |
| Graphene Grade 2 (wt%) | 0.000 | 0.000 | 0.000 | 0.000 | 0.000 | 0.5 | 0.03 | 0.003 | 0 | 0 | 0 | 0 |
| Conductive Carbon Black (CB) | 0 | 0 | 0 | 0 | 0 | 0 | 0 | 0 | 0.1 | 0 | 0.05 | 0 |
| Single Wall Carbon Nanotubes (SWCNTs) | 0 | 0 | 0 | 0 | 0 | 0 | 0 | 0 | 0 | 0.1 | 0 | 0.05 |

FIG. 2

| Formulation: | Control B | Control A | 1 | 2 | 3 | 4 | 5 | 6 | 7 | 8 | 9 | 10 |
|---|---|---|---|---|---|---|---|---|---|---|---|---|
| Mean Ecorr (mV) | -908 | -1090 | -797 | -1090 | -689 | -1030 | -958 | -1060 | n/a | n/a | n/a | n/a |
| Mean Beta A (V/decade) | 0.4663 | 0.9543 | 0.2034 | 0.8662 | 0.0243 | 0.5680 | 0.3792 | 0.8343 | n/a | n/a | n/a | n/a |
| Mean Beta C (V/decade) | 0.2084 | 0.1847 | 0.2254 | 0.5344 | 0.3138 | 0.4040 | 0.2085 | 0.3417 | n/a | n/a | n/a | n/a |
| Mean Icorr (nA) | 10900.00 | 621.00 | 261.00 | 10.40 | 139.00 | 8.96 | 10.30 | 13.00 | n/a | n/a | n/a | n/a |
| Mean Corrosion Rate (mil per year) | 0.3200 | 0.0188 | 0.0077 | 0.0003 | 0.0041 | 0.0003 | 0.0003 | 0.0004 | n/a | n/a | n/a | n/a |
| Mean Corrosion Rate (μ per year) | 8.0000 | 0.4695 | 0.1918 | 0.0077 | 0.1022 | 0.0066 | 0.0076 | 0.0095 | n/a | n/a | n/a | n/a |

Sample Data - Unscribed Samples

FIG. 3a

Sample Data - Scribed Samples

| Formulation: | Control B | Control A | 1 | 2 | 3 | 4 | 5 | 6 | 7 | 8 | 9 | 10 |
|---|---|---|---|---|---|---|---|---|---|---|---|---|
| Mean Ecor (mV) | -908 | -797 | -1010 | -698 | -806 | -958 | -964 | -838 | -736 | -833 | -826 | -723 |
| Mean Beta A (V/decade) | 0.4385 | 0.1976 | 0.9174 | 0.0435 | 0.2558 | 0.3759 | 0.3720 | 0.2155 | 0.64 | 0.83 | 0.27 | 0.92 |
| Mean Beta C (V/decade) | 0.2027 | 0.2221 | 0.1441 | 0.3826 | 0.2115 | 0.2096 | 0.2019 | 0.0961 | 0.22 | 0.3 | 0.16 | 0.26 |
| Mean Icorr (nA) | 10400.00 | 84.64 | 172.01 | 173.00 | 8.52 | 10.20 | 10.20 | 159.00 | 175.08 | 1212.6 | 210.67 | 2377.1 |
| Mean Corrosion Rate (mil per year) | 0.306200 | 0.00248459 | 0.0050581 | 0.005092 | 0.000251 | 0.000301 | 0.000301 | 0.004667 | 0.005148 | 0.0356581 | 0.0061950 | 0.0699019 |
| Mean Corrosion Rate (μ per year) | 7.655000 | 0.06320687 | 0.1284781 | 0.127300 | 0.006265 | 0.007523 | 0.007515 | 0.116675 | 0.130771 | 0.9057180 | 0.157351 | 1.7755091 |

FIG. 3b

| Formulation | Control C | 11 | 12 | 13 | 14 | 15 |
|---|---|---|---|---|---|---|
| Epoxy (wt%) | 100 | 99.9 | 99.75 | 99.5 | 99 | 95 |
| Graphene Grade 2 (wt%) | 0 | 0.1 | 0.25 | 0.5 | 1 | 5 |

CORROSION PROTECTION FOR METALLIC SUBSTRATES

CROSS REFERENCE TO RELATED APPLICATIONS

This application is a US national stage entry of International Patent Application No. PCT/GB2019/050322, filed Feb. 6, 2019, which claims priority to GB1801931.5, filed Feb. 6, 2018, the entire contents of each of which are incorporated by reference herein.

BACKGROUND OF THE DISCLOSURE

This invention relates to corrosion protection for metallic substrates. In particular, this application relates to corrosion protection for metallic substrates such as but not limited to aluminium and aluminium alloys.

Some known compositions for use in offering corrosion protection to metallic substrates are generally known as inhibitive coatings and compositions. Such coatings and compositions are primarily applied as primers because they function by reaction of constituents/pigments of the coating with a metallic substrate. The inhibitive mechanism relies on passivation of the metal and the build-up of a layer of oxides as well as metallic complexes on the surface of the metallic substrate. The oxides and metallic complexes impede the transport of aggressive species to the metal of the substrate.

The active constituents/pigments of inhibitive coatings are typically marginally water soluble and produce active species which inhibit the ongoing corrosion of the metallic substrate. The active constituents/pigments currently used are commonly chromates but other species such as phosphates, molybdates, nitrates, borates and silicates are also used. The selection of active constituents/pigments is increasingly subject to regulatory pressures due to increased concerns for the environment and health and safety.

Current regulations in the European Union restrict the materials which can be used in inhibitory coatings. Chrome (VI) compounds have been subject to authorisation under REACH (2008 Annex XIV). Other legislative measures relating to anticorrosive pigments include the ELV (End of Life vehicle) directive which has seen the phase out of lead pigments from 2003 and Cr(VI) in primers and pre-treatments from 2007.

Other regulations include WEEE (Waste Electrical and Electronic Equipment Directive 2006) and RoHS (Restriction of Hazardous Substances Directive 2002) directives which restricted use of Cr(VI) in white goods. In the US OSHA (Occupational Safety and health Administration regulation 2006) reduced employee permissible exposure to Cr(VI) 52 µg/m$^3$ to 5 µg/m$^3$. Zinc phosphate is also becoming of increasing concern given that it is toxic to aquatic organisms and may cause long-term adverse effects in the aquatic environment. Accidental ingestion of the active constituents/pigments may be damaging to the health of the individual. Soluble zinc salts produce irritation and corrosion of the alimentary tract with pain, and vomiting.

The mechanism of inhibitive pigments is based on the partial dissolution of the pigment by water diffused into the coating. At the surface of the substrate the dissolved ions react and form a reaction product that passivates the surface. It is critical that the active constituents/pigments are sufficiently highly soluble to release ions for reaction. Too high a solubility can, however, result in blistering of the coating. An ideal inhibitive coating should form a barrier against water and detrimental ions while simultaneously releasing sufficient quantity of inhibitor ions. These two requirements are antagonistic in principle and the inhibitive coating requires a balance between the barrier properties of the coating (the lower the permeability the better the barrier properties) and in the ability of pigment to solvate and the ions created to transfer to the coating substrate interface (the higher the permeability the greater the solvation and transfer of ions).

Other known compositions for use in offering corrosion protection to metallic substrates comprise a carrier medium and graphene platelets at a quantity of at least 0.1 wt %. The graphene platelets may be dispersed directly into the carrier medium, for example a typical coating resin system including, but not limited to: crosslinkable resins, non-crosslinkable resins, thermosetting acrylics, aminoplasts, urethanes, carbamates, polyesters, epoxies, silicones, polyureas, silicates, polydimethyl siloxanes using methods such as triple roll mills. Alternatively, the graphene may be introduced via a solvent dispersion in which support resins and dispersants may be used to deliver optimum dispersion and stabilisation. Such solvent dispersions may be made using combination of ultrasonics and beadmill processing. The incorporation of graphene into a resin enables the delivery of graphene in a traditional coating format and as such deliverable by any of the traditional methods available (brush, roller, airspray, airless, electrostatic spray, rotary atomising, dip coating, flow coating, curtain coating, and electrocoating). The graphene will, depending on concentration of incorporation and applied dry film thickness, result in multiple layers of graphene platelets in the coating. The presence of multiple layers of graphene platelets provides a complex and tortuous path for the penetration of water and the dissolved oxygen or ions it carries through the coating.

BRIEF DESCRIPTION OF THE DRAWINGS

FIG. 1 shows conductivity values of various components;

FIG. 2 shows various formulations;

FIG. 3*a* show data demonstrating electrochemical values obtained for samples which have intact coatings;

FIG. 3*b* show data demonstrating electrochemical values obtained for samples which have scribe damage;

DETAILED DESCRIPTION

Figure 4:
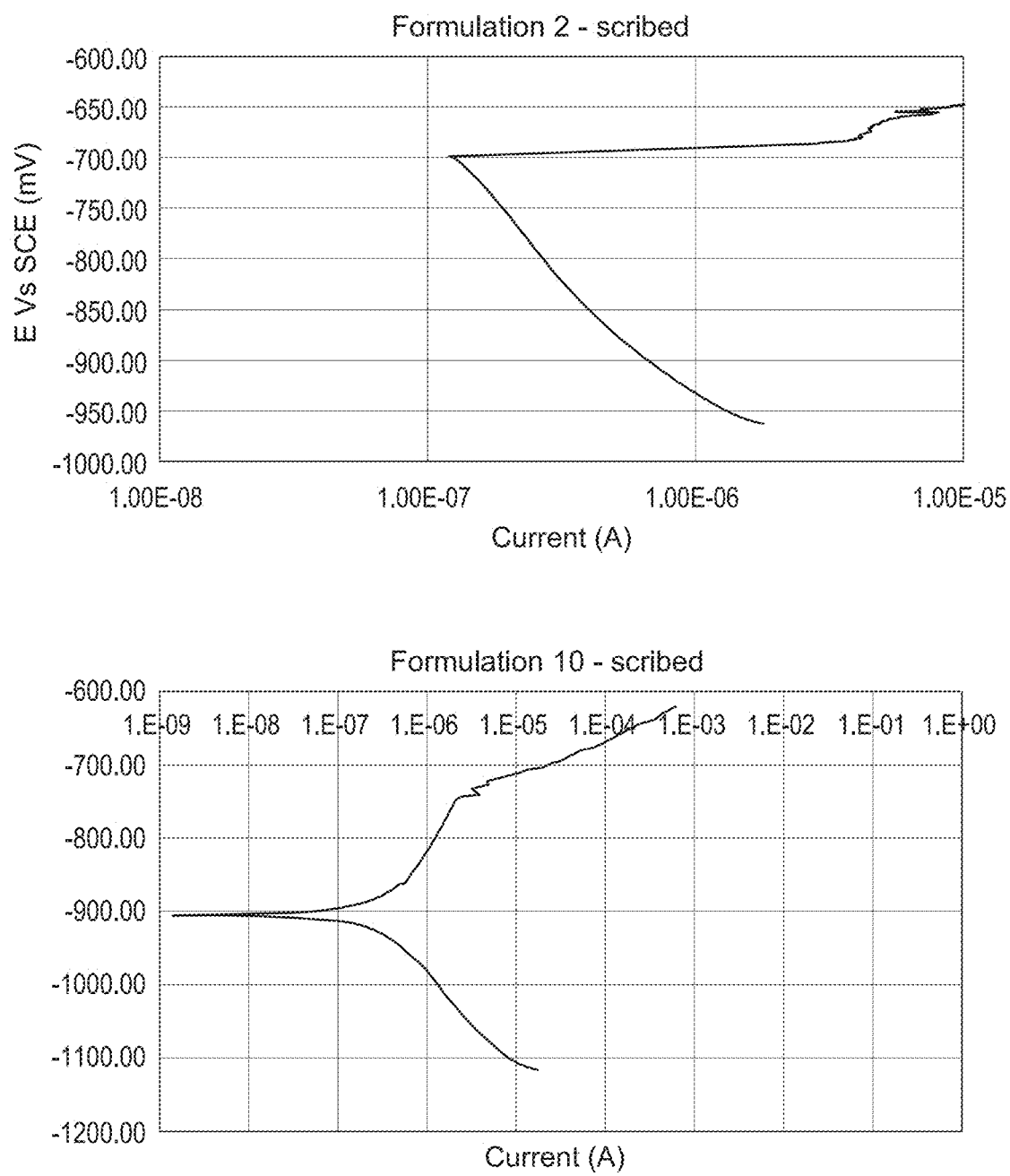
FIG. 4 shows Tafel plots for Formulations 2 and 10 when scribed.
Figure 5:
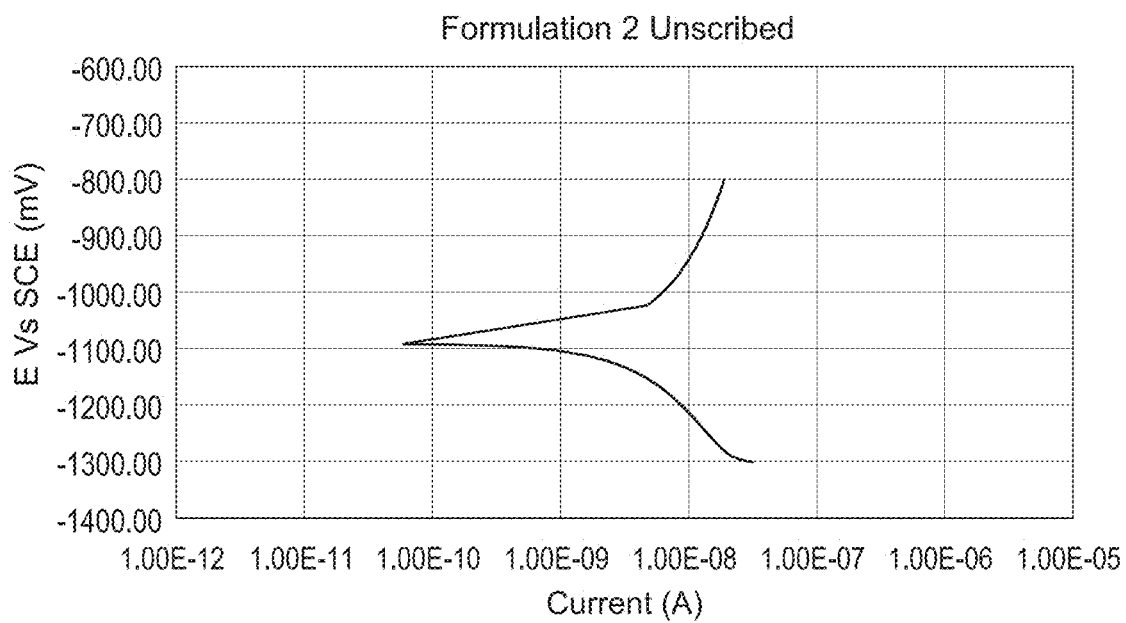
FIG. 5 shows a Tafel plot for Formulation 2 when unscribed.
Figure 6:
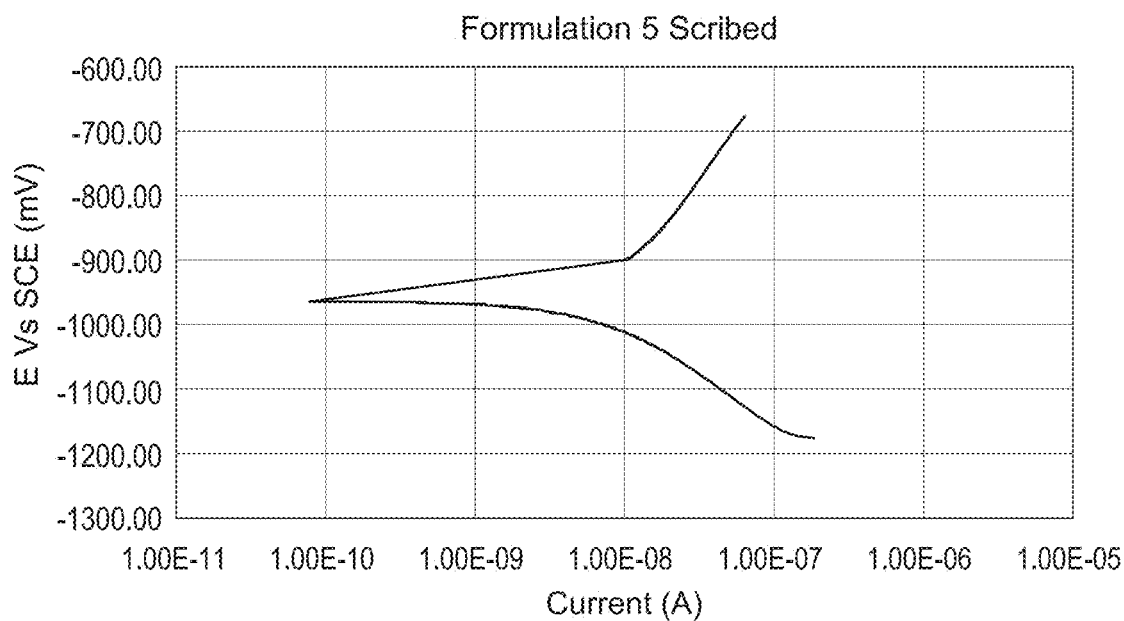
FIG. 6 shows a Tafel plot for Formulation 5 when scribed.
Figure 7:
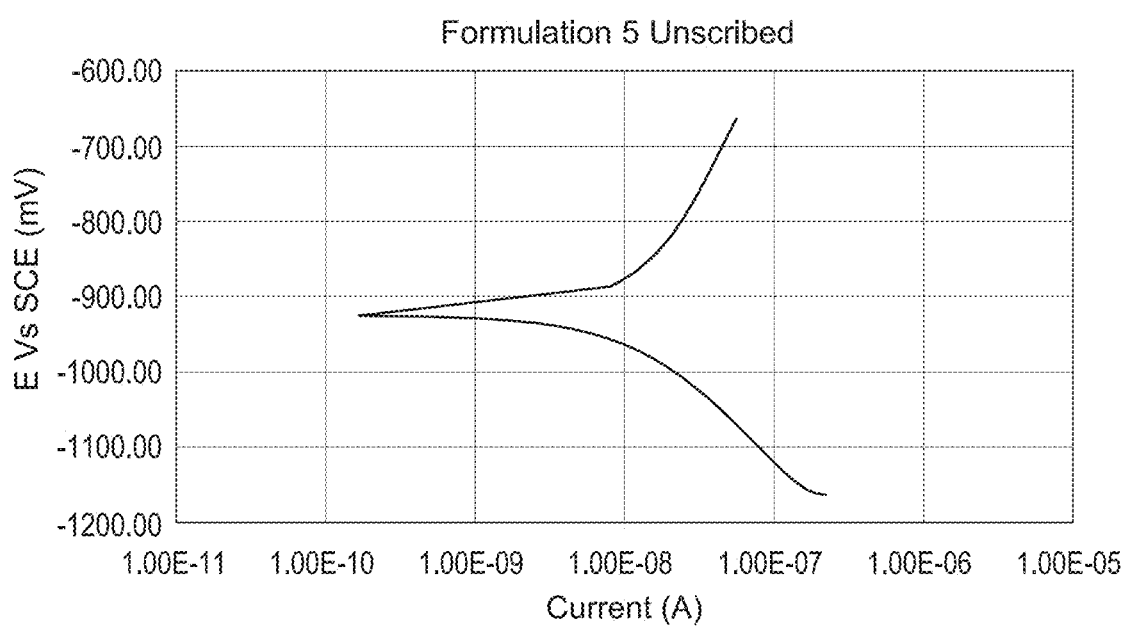
FIG. 7 shows a Tafel plot for Formulation 5 when unscribed.
Figures 8, 9:
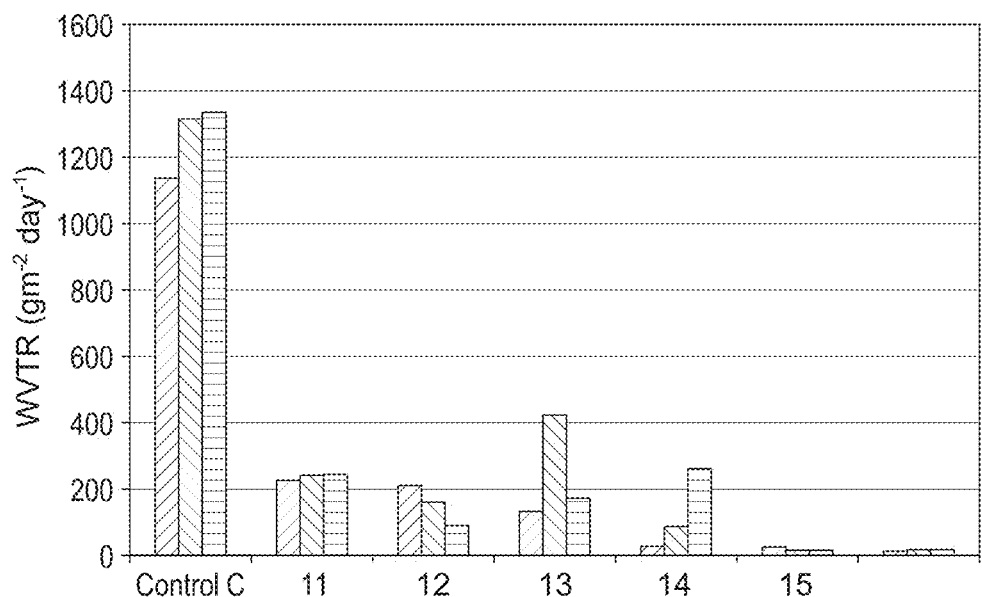
FIG. 8 shows various formulations.
FIG. 9 shows a graph of transmission of water through the film for various formulations.

According to a first aspect of the present invention there is provided a composition suitable for coating a metallic substrate that is susceptible to corrosion characterised in that the composition comprises a carrier medium, 2D material/graphitic platelets, and one or both of conductive carbon black particles and carbon nanotubes in which the 2D material/graphitic platelets comprise: nanoplates of one or more 2D materials and or nanoplates of one or more layered 2D materials and or graphite flakes in which the graphite flakes have one nanoscale dimension and 25 or less layers, the conductive carbon black particles have a mean particle size in the range of 1 nm to 1000 nm, and the carbon nanotubes are single or multiwalled 2D materials (sometimes referred to as single layer materials) are crystalline materials consisting of a single layer of atoms. Layered 2D materials consist of layers of 2D materials weakly stacked or bound to form three dimensional structures. Nanoplates of 2D materials and layered 2D materials have thicknesses within the nanoscale or smaller and their other two dimensions are generally at scales larger than the nanoscale.

2D materials used in the composition of the present invention may be graphene (C), graphyne (C), phosphorene (P), borophene (B), or a 2D in-plane heterostructure of two or more of the aforesaid materials.

Layered 2D materials may be layers of graphene (C), graphyne (C), phosphorene (P), borophene (B), or a 2D vertical heterostructure of two or more of the aforesaid materials.

The preferred 2D material is graphene.

Preferred graphene materials are graphene nanoplates, bilayer graphene nanoplates, trilayer graphene nanoplates, few-layer graphene nanoplates, and graphene nanoplates of 6 to 10 layers of carbon atoms. Graphene nanoplates typically have a thickness of between 0.3 nm and 3 nm, and lateral dimensions ranging from around 100 nm to 100 μm.

Graphite flakes with at least one nanoscale dimension are comprised of at least 10 layers of carbon atoms. Preferred graphite flakes are graphite flakes with nanoscale dimensions and 10 to 20 layers of carbon atoms, graphite flakes with nanoscale dimensions and 10 to 14 layers of carbon atoms, graphite flakes with nanoscale dimensions and 25 or less layers of carbon atoms, graphite flakes with nanoscale dimensions and 20 to 25 layers of carbon atoms. It is preferred that the graphite flakes have lateral dimensions ranging from around 100 nm to 100 μm.

In some embodiments of the present invention the 2D material/graphitic platelets are graphene platelets. Graphene platelets comprise one of or a mixture of two or more of graphene nanoplates, bilayer graphene nanoplates, few-layer graphene nanoplates, and/or graphite flakes with nanoscale dimensions and 25 or less layers.

In some embodiments of the present invention the 2D material/graphitic platelets comprise between 0.002 wt % and 0.09 wt % of the composition.

In some embodiments of the present invention the total weight of the 2D material/graphitic platelets, conductive carbon black particles, and carbon nanotubes comprises between 0.002 wt % and 0.09 wt % of the composition.

In some embodiments of the present invention at least 50 wt % of the 2D material/graphitic platelets comprise graphite flakes with nanoscale dimensions and 25 or less layers.

In some embodiments of the present invention the 2D material/graphitic platelets and conductive carbon black particles and or carbon nanotubes in combination comprise between 0.002 wt % and 0.004 wt % of the composition, between 0.003 wt % and 0.004 wt % of the composition between 0.0026 wt % and 0.04 wt % of the composition, between 0.0026 wt % and 0.0035 wt % of the composition, between 0.006 wt % and 0.009 wt % of the composition, around 0.003 wt % of the composition, or around 0.03 wt % of the composition.

In some embodiments of the present invention the 2D material/graphitic platelets comprise between 0.002 wt % and 0.004 wt % of the composition, between 0.003 wt % and 0.004 wt % of the composition between 0.0026 wt % and 0.04 wt % of the composition, between 0.0026 wt % and 0.0035 wt % of the composition, between 0.006 wt % and 0.009 wt % of the composition, around 0.003 wt % of the composition, or around 0.03 wt % of the composition.

In some embodiments of the present invention the ratio of the weight of the 2D material/graphitic platelets to the total weight of the 2D material/graphitic platelets and conductive carbon black particles and or carbon nanotubes is 50%, 60%, 70%, 80%, 20%, 30%, 40%, between 50 and 60%, between 50 and 70%, between 50 and 80%, between 20 and 50%, between 30 and 50%, between 40 and 50%, between 20 and 80%, between 30 and 70%, or between 40 and 60%.

A coating using such compositions has been found to have a packing density of the combined 2D material/graphitic platelets, conductive carbon black particles, and or carbon nanotubes which is sufficiently low that substantially all of the 2D material/graphitic platelets, conductive carbon black particles, and or carbon nanotubes are fully encapsulated within the carrier medium and the majority of the 2D material/graphitic platelets, conductive carbon black particles, and or carbon nanotubes are not in physical and/or electrical contact with any other 2D material/graphitic platelets, conductive carbon black particles, and or carbon nanotubes.

This full encapsulation of the 2D material/graphitic platelets, conductive carbon black particles, and or carbon nanotubes in the carrier medium and the lack of contact between the 2D material/graphitic platelets, conductive carbon black particles, and or carbon nanotubes has surprisingly been found to have considerable benefits. In particular, because none of the 2D material/graphitic platelets, conductive carbon black particles, and or carbon nanotubes are in contact with each other or the metallic substrate in the coating/composition as applied they cannot cause the formation of any galvanic cells on the surface of the substrate.

An uncoated/protected metal substrate will oxidize/corrode at a rate dependent on the environmental conditions in which the substrate is located. If the environmental conditions include moisture then the oxidation tends to be more rapid than when the environmental conditions are dry.

It has been found that when a coating using a composition according to the first aspect of the present invention is damaged sufficiently for the metallic substrate to be exposed, some of the 2D material/graphitic platelets, conductive carbon black particles, and or carbon nanotubes are driven into contact with the metallic substrate in the area of the damage and/or some of the 2D material/graphitic platelets, conductive carbon black particles, and or carbon nanotubes are exposed to the atmosphere in the damaged faces of the coating. The exposed 2D material/graphitic platelets, conductive carbon black particles, and or carbon nanotubes will then, especially in the presence of moisture, catalyse the oxidation of the metallic substrate.

When the metallic substrate is aluminium or an alloy of aluminium, electrochemical oxidation may occur.

This is predominantly an electrochemically-driven redox process where the oxidation half reaction at the anodic sites proceeds as follows:

$$Al \rightarrow Al^{3+} + 3e^-$$

The complimentary reduction process which occurs at the cathodic sites on the metal surface proceeds as follows:

$$O_2 + 2H_2O + 4e^- \rightarrow 4OH^-$$

By their very nature, the above oxidation and reduction reactions are coupled by electron transfer, and the reaction of their ionic products as follows:

$$Al^{3+} + 3OH^- \rightarrow Al(OH)_3$$

Overall, the electrochemical oxidation of aluminium is as follows:

The aluminium hydroxide may then be transformed into alumina by hydration:

The alumina ($Al_2O_3 \cdot 3H_2O$) layer is normally 5-10 nanometres thick and is formed as soon as the metal comes into contact with an oxidising environment. The alumina has a dual nature and consists of a compact and stable inner oxide layer covered with a porous, less stable outer layer which is more susceptible to corrosion/dissolution with the result that the corrosion resistance of the aluminium substrate is dependent on the stability of the oxide layer. The alumina layer is of a much lower electrical conductivity than the aluminium.

It has been found that the catalysation of the aluminium oxidation both increases the rate of oxidation of the aluminium to alumina and causes that oxidation to continue until a thick layer of alumina has built up and sealed the aluminium substrate and the exposed 2D material/graphitic platelets, conductive carbon black particles, and or carbon nanotubes from the atmosphere. As a result, the presence of the 2D material/graphitic platelets, conductive carbon black particles, and or carbon nanotubes in the composition according to the first aspect of the present invention at the quantities discussed above causes the coating formed from that composition to be self-healing because the alumina formed heals the damage to the coating.

The self-healing nature of the coating has an additional benefit in that because any damage to the coating is rapidly closed by the alumina, the chances of water entering the interface between the aluminium substrate and the coating, subsequently propagating out from the area of damage, and causing delamination of the coating are substantially reduced.

Further benefits of the composition according to the first aspect of the present invention are as follows:

The 2D material/graphitic platelets, conductive carbon black particles, and or carbon nanotubes used in the present invention do not have the proven environmental detriments that are known to exist for phosphates, chromates, molybdates, nitrates, borates or silicates.

The 2D material/graphitic platelets used in combination with carbon nanotubes of the present invention are a relatively new technology and it is not yet known whether they may themselves have any environmental detriment. If they are found to give rise to environmental problems then the levels of the 2D material/graphitic platelets, and carbon nanotubes are so low that those environmental detriments will be minimised.

The 2D material/graphitic platelets, conductive carbon black particles, and or carbon nanotubes in the present invention are generally of lower density than phosphates, chromates, molybdates, nitrates, borates or silicates leading to lighter coatings. This is particularly so given the quantities of 2D material/graphitic platelets, conductive carbon black particles, and or carbon nanotubes in the present invention.

In some embodiments of the present invention more than 50%, 60%, 70%, 80% 90% or 95% of the 2D material/graphitic platelets are graphene and have an electrical conductivity greater than around $2.15 \times 10^7$ S/m at 20° C. or around $3.5 \times 10^7$ S/m at 20° C. Such high levels of conductivity assist in the catalysation of the oxidation of the exposed metal substrate.

In some embodiments of the present invention more than 50%, 60%, 70%, 80% 90% or 95% of the conductive carbon black particles have an electrical conductivity greater than around $1.0 \times 10^4$ S/m at 20° C. Such high levels of conductivity assist in the catalysation of the oxidation of the exposed metal substrate.

In some embodiments of the present invention more than 50%, 60%, 70%, 80% 90% or 95% of the carbon nanotubes have an electrical conductivity greater than around $1.00 \times 10^6$ S/m at 20° C. Such high levels of conductivity assist in the catalysation of the oxidation of the exposed metal substrate.

In some embodiments of the present invention the 2D material/graphitic platelets have a particle size distribution in which D50 is equal to or less than 50 μm, equal to or less than 30 μm, equal to or less than 20 μm, or equal to or less than 15 μm. The processing of the 2D material/graphitic platelets may be carried out by a triple roll mill, with gap sizes of 15/5 micons at 3 passes, bead milling, ultrasonication, ultra high speed dispersion or other appropriate known techniques. Particle size may be measured on a Malver Mastersizer 3000 by dilution of the carrier resin in a suitable solvent after which the D50 particle sizes are measured.

In some embodiments of the present invention the carrier medium is an electrical insulator.

In some embodiments of the present invention the carrier medium is selected from known crosslinkable resins, non-crosslinkable resins, thermosetting acrylics, aminoplasts, urethanes, carbamates, polyesters, epoxies, silicones, polyureas, silicates, polydimethyl siloxanes, and mixtures and combinations thereof. The selection of the appropriate carrier medium will be dependent on the intended circumstances of use for the composition according to the first aspect of the present invention.

In some embodiments of the present invention the carrier medium is plastically deformable once it has set/cured. The characteristic of the carrier medium being plastically deformable once it has set/cured has the result that it has sufficient flexibility not to expose large areas of substrate when damaged. Such a characteristic of the carrier medium will have the effect that damage to the coating using a composition including such a carrier medium will be relatively localised to the cause of the damage and it is unlikely that the damage will propagate away from the location or cause of the damage.

In some embodiments the strength of adhesion of the carrier medium to the metallic substrate is such that an impact or pressure of sufficient force that the coating is damaged but that the metallic substrate is not deformed does not cause the coating to separate from the metallic substrate.

In some embodiments of the present invention the composition further comprises a solvent and or a dispersant. These will affect the handling and or application properties of the composition and the ease of formulation of the composition respectively.

According to a second aspect of the present invention there is provided a coating system for a metallic substrate that is susceptible to corrosion in which the system comprises the creation of a first coating on the metallic substrate, and, subsequently, a second coating over the first coating characterised in that the first coating is formed from a composition according to the first aspect of the present invention, and the second coating is formed from a second composition which comprises a carrier medium and 2D material/graphitic platelets in which the 2D material/graphitic platelets comprise more than 0.1 wt % of the second composition.

In some embodiments of the second aspect of the present invention, the 2D material/graphitic platelets of the second composition comprise graphene platelets. In some embodiments the graphene platelets of the second composition comprise one of or a mixture of two or more of graphene, graphene oxide, and/or reduced graphene oxide nanoplates, bilayer graphene, bilayer graphene oxide, and/or bilayer reduced graphene oxide nanoplatelets, few-layer graphene, graphene oxide, and/or reduced graphene oxide nanoplatelets, and/or graphite flakes in which the graphite flakes have one nanoscale dimension and 25 or less layers.

In some embodiments of the second aspect of the present invention, the 2D material/graphitic platelets of the second composition comprises one or a mixture of graphene (C), graphene oxide, reduced graphene oxide, hexagonal boron nitride (hBN), molybdenum disulphide ($MoS_2$), tungsten diselenide ($WSe_2$), silicene (Si), germanene (Ge), Graphyne (C), borophene (B), phosphorene (P), or a 2D in-plane heterostructure of two or more of the aforesaid materials.

Layered 2D materials may be layers of graphene (C), graphene oxide, reduced graphene oxide, hexagonal boron nitride (hBN), molybdenum disulphide ($MoS_2$), tungsten diselenide ($WSe_2$), silicene (Si), germanene (Ge), Graphyne (C), borophene (B), phosphorene (P), or a 2D vertical heterostructure of two or more of the aforesaid materials.

The coating system of the second aspect of the present invention has the benefit that the first and second coats can have different properties and, as a result, offer superior protection to the metallic substrate than either coating alone.

In some embodiments of the second aspect of the present invention the 2D material/graphitic platelets of the second composition comprises between 0.1 wt % and 20 wt % of the composition, between 0.1 wt % and 6.0 wt % of the composition, or between 0.1 wt % and 0.5 wt % of the composition. Such a composition will, as a result, depending on the concentration of incorporation of the 2D material/graphitic platelets and the applied dry film thickness, result in multiple layers of 2D material/graphitic platelets in the coating. The presence of multiple layers of 2D material/graphitic platelets provides a complex and tortuous path for the penetration of water (and any dissolved oxygen or ions it carries) through the coating. That path is expected to be significantly longer than the actual thickness of the second coating.

In some embodiments of the second aspect of the present invention more than 50%, 60%, 70%, 80% 90% or 95% of the 2D material/graphitic platelets of the second composition/coating have an electrical conductivity which is less than the electrical conductivity of more than 50%, 60%, 70%, 80% 90% or 95% of the 2D material/graphitic platelets, conductive carbon black particles and or carbon nanotubes of the first composition/coating.

In some embodiments of the second aspect of the present invention more than 50%, 60%, 70%, 80% 90% or 95% of the 2D material/graphitic platelets of the second composition/coating have an electrical conductivity of around or less than $2.0 \times 10^5$ S/m at 20° C.

According to a third aspect of the present invention there is provided a method of treatment of a metallic substrate in which the substrate is coated with a composition according to the first aspect of the present invention. The coating of the metallic substrate may be by brushing, spraying, dipping or other appropriate application techniques.

In some embodiments of the third aspect of the present invention the metallic substrate is aluminium, an aluminium alloy, or a magnesium based alloy.

According to a fourth aspect of the present invention there is provided a method of treatment of a metallic substrate in which the substrate is treated with the system according to the second aspect of the present invention. The coating of the metallic substrate and, subsequently, the first coating may be by brushing, spraying, dipping or other appropriate application techniques.

In some embodiments of the fourth aspect of the present invention the metallic substrate is aluminium, an aluminium alloy, or a magnesium based alloy.

Further advantages, properties, aspects and features of the present invention will become apparent from the following description of exemplary embodiments:

Experimental Results

Various loadings, including blends, of different carbon types (graphene nanoplatelets, conductive carbon black (CB) and single wall carbon nanotubes (SWCNTs) of varying conductivity, shown in see Table 1, were incorporated into an epoxy system in the quantities shown in Table 2.

The epoxy system used was an epoxy resin with and epoxy equivalent weight of 171-175 g/eq and the Grade 1 and Grade 2 graphene platelets had a particle size with a D50 of less than 50 µm. Control A is the epoxy system with no graphene included, and Control B is no formulation at all. That is Control B is bare, untreated metal.

The epoxy system and carbon material were weighed out using a 4 decimal place analytical balance.

Each of Formulations 1 to 10, Control A and Control B were applied to two aluminium panels. The aluminium panels were each made of aluminium 5005 alloy, an alloy with the following composition Magnesium (Mg) 0.50-1.10 wt %, Iron (Fe) 0.0-0.70 wt %, Silicon (Si) 0.0-0.30 wt %, Zinc (Zn) 0.0-0.25 wt %, Manganese (Mn) 0.0-0.20 wt %, Copper (Cu) 0.0-0.20 wt %, Others (Total) 0.0-0.15 wt %, Chromium (Cr) 0.0-0.10 wt %, Other (Each) 0.0-0.05 wt %, Aluminium (Al) Balance. Each Formulation and Control was applied by spray application, using a conventional gravity-fed gun, through a 1.2 mm tip, resulting in dry film thicknesses ranging from 40-60 µm on the aluminium panels. The panels were cured for 1 week at ambient temperature, before commencing testing.

One panel for each Formulation and Control was scribed with a 225 mm scribe using a knife. Care was taken that the scribes were as consistent as possible throughout due to relatively small surface area of study. The panels for each Formulation and Control were tested in duplicate in both scribed and unscribed forms. Scribed samples were studied because they offer an immediate study of a bare metal surface which may be contacted with an electrolyte without having to observe the lengthy breakdown/degradation of the film coating e.g. due to water uptake.

All electrochemical measurements were recorded using a Gamry 1000E potentionstat in conjunction with a Gamry ECM8 multiplexer to permit the concurrent testing of up to 8 samples per experiment. Each individual channel was connected to a Gamry PCT-1 paint test cell, specially designed for the electrochemical testing of coated samples.

Within each paint test cell, a conventional three-electrode system was formed, the bare aluminium, epoxy coated aluminium, and scribed coated epoxy aluminium panels were the working electrode, a graphite rod served as a counter electrode and a saturated calomel electrode (SCE) served as the reference electrode. All tests were run using a 3.5 wt % NaCl electrolyte.

For all samples, electrochemical testing consisted of corrosion potential measurements ($E_{corr}$) followed by potentiodynamic polarisation scans. Since this work is focussed on the change in electrochemical properties over time, each cycle of experiments was conducted at approximate intervals of 2 hours over a period of 1 week for all samples.

Potentiodynamic polarisation scans were carried out in order to generate Tafel polarisation curves. These curves were produced as a result of applying a potential of ±250 mV from the open circuit potential (500 mV sweep) at a scan rate of 0.5 mV/second with a sample period of 1 second, over a coated sample area (working electrode area) of 14.6 cm². Data fitting to the Tafel region was carried out using the Gamry Echem Analyst software in order to extract values for the anodic and cathodic Tafel constants, $E_{corr}$, and corrosion rate. These values were then plotted for the time duration of the experiment.

All corrosion potential ($E_{corr}$) measurements were recorded against the SCE reference electrode.

Potentiodynamic polarisation scans permit considerable amounts of information on electrode processes to be determined. Through this technique, information on corrosion rate, pitting susceptibility, passivity and anode/cathode behaviour of an electrochemical system may be obtained. During such scans, the driving force of the anodic/cathodic reactions (potential) is varied and the net change in reaction rate (the current) is measured. Tafel plots are usually displayed with the applied potential on the y axis and the logarithm of the measured current on the x axis, where the top half above the corrosion potential represents the anodic portion of the plot and the bottom half below the corrosion potential represents the cathodic portion of the plot. The Tafel region or active region is usually a straight line and represents electron transfer i.e. the metal oxidation reaction for the anode and the oxygen reduction process in the case of the cathode. The intersection point of back extrapolation of the anodic and cathodic Tafel slopes represents the corrosion current, from which a corrosion rate may be determined. The gradient of the Tafel slopes themselves is equivalent to the Anodic/Cathodic Tafel constants, measured in volts/decade, and these values are a measure of the degree of increase in the overpotential required to increase the reaction rate (the current) by a factor ten.

Beyond the Tafel regions, when an extended potential range is applied, additional useful features may be observed in the polarisation data. In the case of the anode, one such feature is known as the passivation potential. As the applied potential increases above this value, a decrease in the measured current density is observed until a low, passive current density is achieved; the point at which the current density undergoes no change with an increase in applied potential (passive region). Beyond this point, if the applied potential permits and is sufficiently positive, the current rapidly increases: the breakaway potential. For aluminium alloys, this breakaway potential may be due to a localised breakdown in passivity (pitting).

Example Data

The data in Tables 3a and 3b demonstrates the electrochemical values obtained for samples which have scribe damage, and intact coatings. It shows the corrosion potential ($E_{corr}$) The anodic and cathodic currents, and corrosion rate in μm per year and mils per year. This data is used to construct Tafel plots which in themselves demonstrate whether the corrosion mechanism is by barrier, or passivation.

For the hybrid samples, including carbon black particles, single wall carbon nanotubes and graphene Grade 1, and blends thereof, the coatings were not studied in an unscribed state since no effect on the corrosion of the substrate was observed with fully intact coatings. This is due to the fact that corrosive species such as water, ions or oxygen are prevented from interacting with the substrate.

The Tafel plot showing passivation occurring with Formulations 2 and 10 when scribed is shown in Table 4. The plots are labelled with the formulation number.

The near flat gradient of the upper curve in Table 4 is consistent with passivation occurring at the substrate in this case an aluminium alloy. When no scribe is present, the coating itself acts as a barrier, and no passivation occurs as water and oxygen are not present at the substrate. The Tafel plot showing no passivation occurring with Formulation 2 when unscribed is shown in Table 5.

In contrast an indication of barrier performance can be seen from Formulation 5. The Tafel plot occurring with Formulation 5 when scribed and unscribed are shown in Tables 6 and 7 respectively. There is little difference in the anodic and cathodic currents shown which is an indication that Graphene Grade 2 performs as a physical barrier, rather than controlling corrosion by passivation.

Barrier performance of the Graphene Grade 2 is also demonstrated with water vapour transmission testing. With five Formulations and a Control C as per Table 8.

The epoxy was cured with a polyamide blend (epoxy:polyamide 5.36:1), and the panels were allowed to cure for a period of at least 7 days at a consistent ambient temperature.

Testing for the transmission of water through the film showed the results in Table 9.

As may be seen, the data in Table 9 demonstrates a significant decrease in the transmission of water through the film as the loading of the Graphene Grade 2 increases.

The invention claimed is:

1. A composition suitable for coating a metallic substrate that is susceptible to corrosion characterised in that the composition comprises a carrier medium, 2D material/graphitic platelets, and one or both of conductive carbon black particles and carbon nanotubes, in which the 2D material/graphitic platelets are comprised of one or more of graphene, layered graphene, and/or graphite flakes in which the graphite flakes have one nanoscale dimension and 25 or less layers, the conductive carbon black particles have a mean particle size in the range of 1 nm to 1000 nm, and the carbon nanotubes are single or multiwalled, and in which at least 50% of the graphene, layered graphene, and/or graphite flakes have an electrical conductivity greater than $3.5 \times 10^7$ S/m at 20° C.

2. A composition according to claim 1 in which the 2D material/graphitic platelets and conductive carbon black particles and/or carbon nanotubes in combination comprise between 0.002 wt % and 0.09 wt % of the composition.

3. A composition according to claim 1 in which the ratio of the weight of the 2D material/graphitic platelets to the total weight of the 2D material/graphitic platelets and conductive carbon black particles and/or carbon nanotubes is between 20 and 80%.

4. A composition according to claim 1 in which at least 50% of the 2D material/graphitic platelets and conductive carbon black particles and/or carbon nanotubes are not in physical and/or electrical contact with any other 2D material/graphitic platelets and conductive carbon black particles and/or carbon nanotubes.

5. A composition according to claim 1 in which at least one of the 2D material/graphitic platelets and conductive carbon black particles and/or carbon nanotubes have a particle size distribution with a D50 of less than 30 μm.

6. A composition according to claim 1 in which at least 50% of the conductive carbon black particles have an electrical conductivity greater than around $1.0 \times 10^4$ S/m at 20° C. or in which at least 50% of the carbon nanotubes have an electrical conductivity greater than around $1.00 \times 10^6$ S/m at 20° C.

7. A composition according to claim 1 in which at least 50 wt % of the 2D material/graphitic platelets are comprised of graphite flakes with nanoscale dimensions and 25 or less layers.

8. A composition according to claim 1 in which the carrier medium is an electrical insulator and in which the carrier medium is selected from crosslinkable resins, non-crosslinkable resins, thermosetting acrylics, aminoplasts, urethanes, carbamates, polyesters, epoxies, silicones, polyureas, silicates, polydimethyl siloxanes, and mixtures and combinations thereof and in which the carrier medium is plastically deformable once it has set/cured.

9. A composition according to claim 1 in which the composition further comprises a solvent and a dispersant.

10. A coating system for a metallic substrate that is susceptible to corrosion for creation of a first coating on the metallic substrate, and, subsequently, a second coating over the first coating characterised in that the first coating comprises a composition according to claim 1, and the second coating is formed from a second composition which comprises a carrier medium and 2D material/graphitic platelets in which the 2D material/graphitic platelets comprise more than 0.1 wt % of the second composition.

11. A coating system according to claim 10 in which the 2D material/graphitic platelets of the second composition comprises one of or a mixture of two or more of graphene, graphene oxide, reduced graphene oxide nanoplates, hexagonal boron nitride, molybdenum disulphide, tungsten diselenide, silicene, germanene, Graphyne, borophene, phosphorene, a 2D in-plane heterostructure of two or more of graphene, graphene oxide, reduced graphene oxide nanoplates, hexagonal boron nitride, molybdenum disulphide, tungsten diselenide, silicene, germanene, Graphyne, borophene, phosphorene, bilayer graphene, bilayer graphene oxide, bilayer reduced graphene oxide nanoplatelets, few-layer graphene, few-layer graphene oxide, few-layer reduced graphene oxide nanoplatelets, graphite flakes in which the graphite flakes have one nanoscale dimension and 25 or less layers, layered hexagonal boron nitride (hBN), molybdenum disulphide ($MoS_2$), tungsten diselenide ($WSe_2$), silicene (Si), germanene (Ge), Graphyne (C), borophene (B), phosphorene (P), and/or a 2D vertical heterostructure of two or more of the aforesaid materials.

12. A coating system according to claim 10 in which the 2D material/graphitic platelets of the second composition comprise between 0.1 wt % and 20 wt % of the composition, between 0.1 wt % and 6.0 wt % of the composition, or between 0.1 wt % and 0.5 wt % of the composition.

13. A coating system according to claim 10 in which more than 50% of the 2D material/graphitic platelets of the second composition have an electrical conductivity which is less than the electrical conductivity of more than 50% of the 2D material/graphitic platelets of the composition.

14. A coating system according to claim 10 in which more than 50% of the 2D material/graphitic platelets of the second composition have an electrical conductivity of around or less than $2.0 \times 10^{-5}$ S/m at 20° C.

15. A method of treatment of a metallic substrate in which the substrate is coated with a composition according to claim 1.

16. A method of treatment according to claim 15 in which the substrate is aluminium, an aluminium alloy, or a magnesium based alloy.

17. A method of treatment of a metallic substrate in which the substrate is treated with the system according to claim 10.

18. A method of treatment according to claim 17 in which the substrate is aluminium, an aluminium alloy, or a magnesium based alloy.

* * * * *